(12) United States Patent
Whitcomb

(10) Patent No.: US 6,244,718 B1
(45) Date of Patent: *Jun. 12, 2001

(54) MONITOR WITH REAR VIEW MIRROR

(75) Inventor: Ellis Fitzroy Petersen Whitcomb, London (GB)

(73) Assignee: DesignAware Trading Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,896

(22) PCT Filed: Mar. 14, 1997

(86) PCT No.: PCT/GB97/00724

§ 371 Date: Nov. 30, 1998

§ 102(e) Date: Nov. 30, 1998

(87) PCT Pub. No.: WO97/34172

PCT Pub. Date: Sep. 18, 1997

(30) Foreign Application Priority Data

Mar. 14, 1996 (GB) ................................................. 9605362
Nov. 5, 1996 (GB) ................................................. 9623130

(51) Int. Cl.[7] .............................. G02B 7/182; G02B 5/08

(52) U.S. Cl. .......................... 359/872; 359/871; 248/466; 248/476; 312/224; 312/226; 348/844; D6/300; D12/114

(58) Field of Search ...................................... 359/838, 871, 359/872, 881, 840; 248/466, 467, 476, 479, 442.2, 447.1, 447; D6/300, 312; D14/114, 299; 40/219, 358; 348/552, 836, 844; 132/316; 312/224, 225, 226, 227

(56) References Cited

U.S. PATENT DOCUMENTS

| 52,551 | * | 2/1866 | Faris | 40/219 |
|---|---|---|---|---|
| D. 324,463 | * | 3/1992 | Young | D6/300 |
| D. 327,501 | * | 6/1992 | Maloney | D19/88 |
| D. 327,502 | * | 6/1992 | Maloney | D14/114 |
| D. 333,679 | * | 3/1993 | Hoffman et al. | D14/114 |
| D. 345,655 | * | 4/1994 | Freebairn | D6/312 |
| D. 383,313 | * | 9/1997 | Dorr et al. | D6/300 |
| 647,139 | * | 4/1900 | Wahl | 40/219 |
| 3,824,001 | * | 7/1974 | Rosenberg | 359/840 |
| 4,264,144 | | 4/1981 | McCord . | |

(List continued on next page.)

FOREIGN PATENT DOCUMENTS

| 0 667 254 | | 8/1995 | (EP) . | |
|---|---|---|---|---|
| 2 676 165 | | 11/1992 | (FR) . | |
| 1428991 | * | 3/1976 | (GB) | 359/881 |
| 2 104 236 | | 3/1983 | (GB) . | |
| 2 188 013 | | 9/1987 | (GB) . | |
| 2 239 957 | | 7/1991 | (GB) . | |
| 2 253 992 | | 9/1992 | (GB) . | |
| 2 271 751 | | 4/1994 | (GB) . | |
| 2 272 727 | | 5/1994 | (GB) . | |
| 2 190 213 | | 11/1997 | (GB) . | |

*Primary Examiner*—Cassandra Spyrou
*Assistant Examiner*—John Juba, Jr.
(74) *Attorney, Agent, or Firm*—Thomas C. McDonough; Gary R. Jarosik

(57) ABSTRACT

Visual display monitors having a mirror providing a rear view are disclosed. The mirros include support structure to attach a reflective surface to the monitor such that the surface is rotatable while while maintaining a generally fixed orentation relative to the screen of the monitor. The mirror may include a case having front and rear portions rotatable relative to each other. The reflective surface may be rotatable within the front portion. Mirrors may be pivotally connected to monitors for some applications.

10 Claims, 8 Drawing Sheets

U.S. PATENT DOCUMENTS

| | | | |
|---|---|---|---|
| 4,856,888 | * 8/1989 | Wahl | 359/881 |
| 5,041,965 | 8/1991 | Chen | 434/69 |
| 5,084,785 | 1/1992 | Albers et al. | |
| 5,184,956 | 2/1993 | Langlais et al. | 364/200 |
| 5,262,926 | * 11/1993 | Hall | 361/681 |
| 5,383,061 | 1/1995 | Lanier | 359/872 |
| 5,386,322 | 1/1995 | Parsons | 359/872 |
| 5,621,577 | * 4/1997 | Lang et al. | 359/872 |
| 5,629,810 | * 5/1997 | Perry et al. | 359/872 |
| 5,940,229 | * 8/1999 | Baumgarten | 359/839 |

* cited by examiner

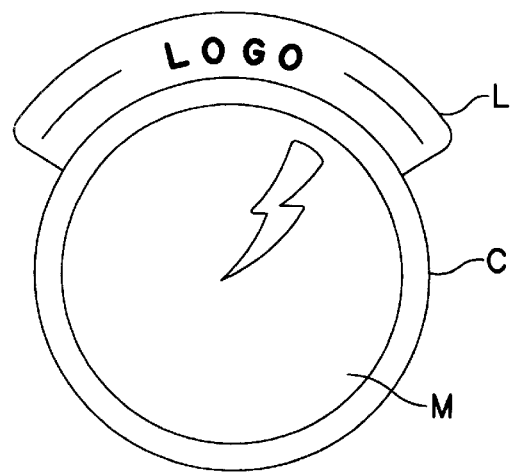
FIG. 1
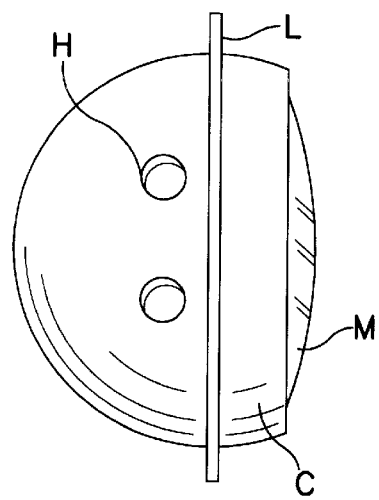 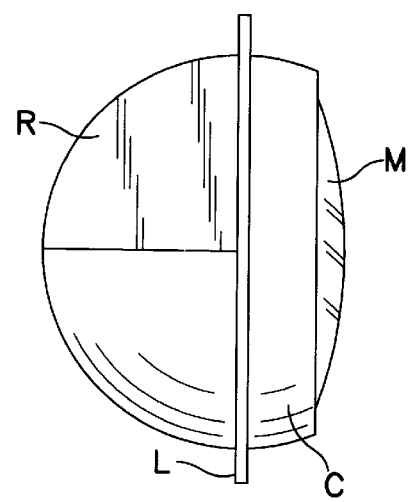
FIG. 2 FIG. 3
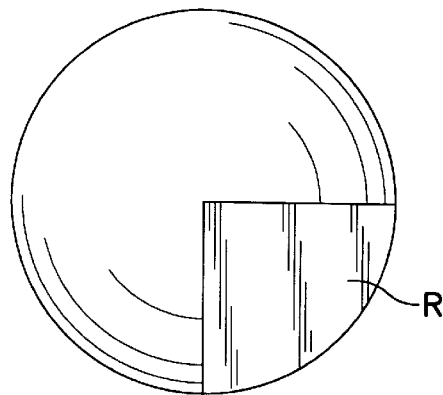
FIG. 4

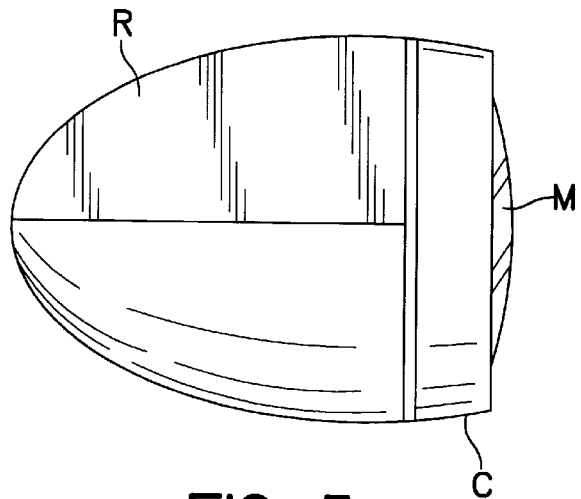
FIG. 5
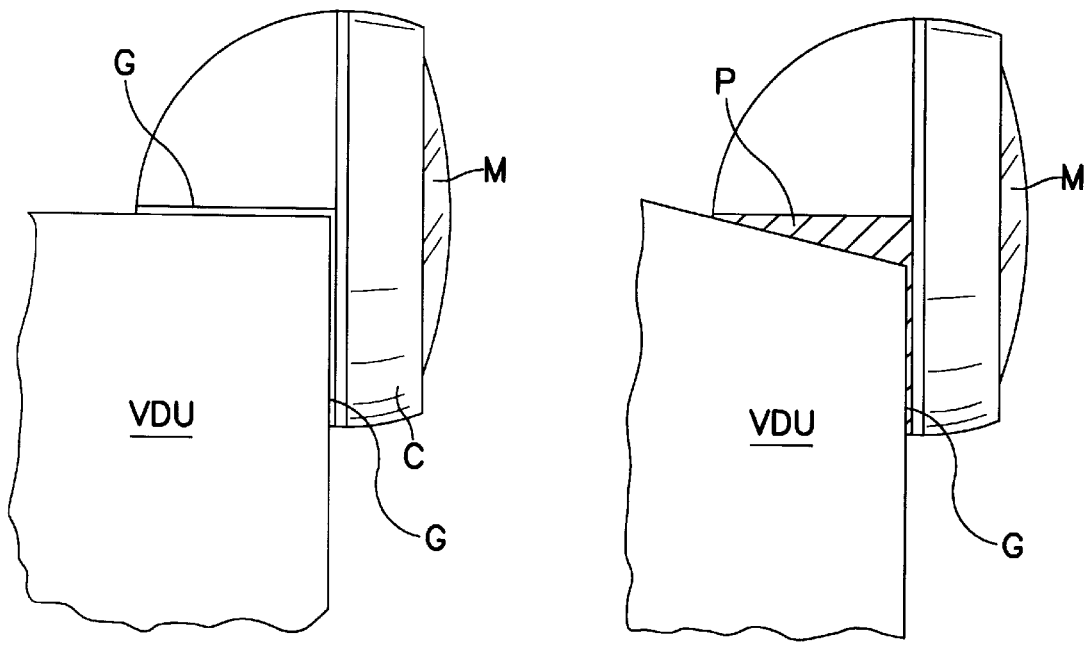
FIG. 6
FIG. 7

MONITOR WITH REAR VIEW MIRROR

BACKGROUND

The present invention relates to monitors such as a monitor for a closed circuit television system or a visual display unit (VDU) for a computer and the like. The invention also relates to a mirror adapted to be mounted on a monitor to afford a user a rear view. The invention has particular, but not exclusive, application to a monitor displaying information which demands a high level of concentration from an operator of the display.

It is recognized that distractions from visual display units can break an operator's concentration which can then take a considerable time to re-build. Visual display units are used in increasingly diverse environments; for example in the workplace, office or home as desktop computers, security monitors or televisions; also increasingly in public places such as aeroplanes, trains and libraries as laptop or notebook computers. The visual display unit is included in many applications and on many occasions demands a high degree of concentration from its operator or those people simply observing the visual display. In such environments the operator is often aware of activities behind him/her and is tempted to look over their shoulder to see what is going on; for example to see who has just entered a room. The temptation may be greater if the visual display unit is displaying sensitive material. Operators often complain that people hovering behind them can be highly distracting and counterproductive. Operators also like to be fully aware of their surroundings.

It is an object of the present invention to ameliorate the above disadvantages.

SUMMARY OF THE INVENTION

According to a first aspect of the present invention there is provided a monitor for displaying information to an operator, the monitor comprising mirror means to afford the operator a rear view.

According to a second aspect of the present invention there is provided a mirror adapted to be mounted to a monitor to afford a user a rear view.

The mirror means comprises a reflective surface and is arranged on the monitor to permit the operator to observe at least some of what is going on behind him/her without having to look over his/her shoulder. The mirror similarly comprises a reflective surface and is adapted for mounting the mirror to a monitor. The use of such mirror means or mirror has been found to reduce the deleterious effects on an operator's concentration of occurrences in the space behind him/her.

The reflective surface of the mirror means or mirror may be adapted to provide a particular viewing perspective, for example comprising a convex or planar surface or combination of such surfaces. The reflective surface may comprise a conventional silver-backed mirror or an alternative reflective material, for example polished sheet metal or an electroplated plastics surface. The reflective surface is preferably formed of acrylic material so as to provide a shatter proof mirror, which can be indelibly printed on.

The mirror means may be attached to the monitor in a number of different ways. The mirror means may be mounted in a holder and attached to the monitor in a rigid manner, for example by means of screws, bolts or adhesive. Alternatively, the mirror means may be articulated to the monitor to allow the operator to adjust the field of rear view. This has the advantage that it can more readily accommodate operators of different heights.

The mirror in accordance with the second aspect of the invention is adapted to be mounted readily to a monitor, without resorting to complex fixing arrangements. Screws and the like are not favoured because of the permanent effects upon the monitor, whereas adhesives, particularly adhesives whose bond may be broken when desired, are preferred. This is particularly important when, as is the case where equipment is leased or used by an employee, the user of the monitor is not also its owner.

The effectiveness of the first aspect of the invention may also be enhanced by adding at least one further mirror means to the monitor. The operator could then, for example, obtain a view over both his/her left and right shoulders. It is also possible to provide a single wide angle mirror means, for example on the top of the monitor, to afford the operator a view over both shoulders. This mirror may also give the operator a view of him or herself which is agreeable to some monitor operators.

The mirror means in accordance with the first aspect of the present invention may be arranged to occupy at least two states: an operational state which affords the operator a rear view and a storage state in which the mirror means is less prone to damage, for example so that the monitor can be transported. This is of particular significance if the monitor is intended to be transported frequently, for example if it comprises a laptop computer. The mirror means may be arranged to swivel about an axis to locate it within, or alongside the monitor

BRIEF DESCRIPTION OF DRAWINGS

The invention will now be described, by way of non-limiting example, with reference to the accompanying drawings, in which:

FIGS. 1 to 4 show views of a mirror in accordance with the second aspect of the present invention;

FIG. 5 shows a view of an alternative mirror in accordance with the second aspect of the invention;

FIGS. 6 and 7 show views of a mirror in accordance with the second aspect of the present invention mounted to respective visual display units;

FIGS. 13 to 16 show a monitor in accordance with the first aspect of the invention having a mirror means that may be arranged in a protected position for storage or transit;

DETAILED DESCRIPTION OF EXEMPLARY EMBODIMENTS

In FIG. 1 a front elevation of a mirror shows a mirror face M mounted in a substantially hemispherical plastics case C to which a extended portion L is attached. The extended portion L occupies approximately a quadrant of the circular front face of the mirror and may carry a company name or promotional information as shown by the word "LOGO" in the figure. This permits the desired name or information to be readily observed by the user of the mirror. The portion L preferably is mounted so as to rotate around at least a portion of the case C to allow a user to adjust it as desired. The portion L may be omitted if desired. The mirror face M in this embodiment may be between 50 and 70 millimetres in diameter to provide a good compromise between physical size and the quality of the rear view afforded to an operator. A mirror face M of diameter 60 millimetres has been found to be a particularly good compromise when provided with a convex profile having a radius of 150 mm. Another particularly good combination is provided by a mirror face M of diameter 73 mm having a convex profile of radius 110 mm. However a range of radii between 75 mm and 200 mm may be used to good effect. The smaller values of radius give a potentially wider field of view but accompanied by a loss of detail. As the radius is made larger the quality of this rear view is improved but the width thereof may be impaired.

FIG. 2 shows a plan view of the mirror shown in FIG. 1. From this figure it can be seen that the mirror face M is slightly convex rather than flat. While a flat mirror surface would work, the convex mirror face gives a broader field of view as will be explained in greater detail with reference to FIGS. 8 and 9. The figure shows that the overall shape of the mirror is somewhere between a hemisphere and a sphere. A hemispherical version could be provided but may be harder to fit to a monitor and looks unbalanced to some people. This figure also shows that the portion L for advertising and the like is substantially flat, allowing advertising material to be provided on the reverse side as well, if desired. The figure also shows an optional feature of a pen holder H of which one or more may be provided. The pen holder H may simply comprise a hole in the surface of the mirror case C of a suitable diameter or may preferably comprise a cavity shaped to accept a writing implement.

Figure 27:
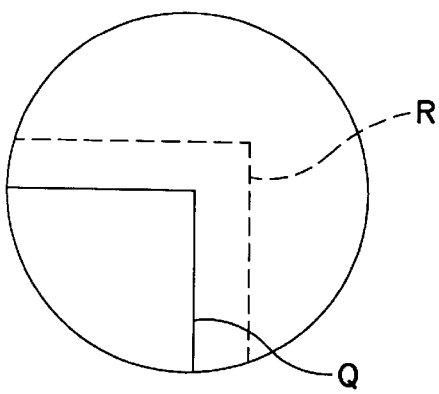
FIG. 27 is a side view of a mirror according to yet another embodiment of the present invention.

FIG. 3 shows a view from beneath the mirror showing small parts of the portion L which protrude around the edge of the case C. In addition this figure shows a recess R in the case C of the mirror. This recess is preferably a rectilinear cut-out to permit the mirror to be mounted to a corner of a monitor or VDU. The manner in which this is achieved is shown in FIGS. 6 and 7. Referring to FIG. 27 of the drawings, the recess R may be greater than a single quadrant Q of the case C so as to enable the mirror face M to be mounted closer to the centre of the operator's field of vision.

The mirror shown in FIGS. 1, 2 and 3 may be constructed from any suitable materials but a plastics construction for the case C is preferred for reasons of ease and low cost of manufacture. The plastics case may be formed, for example as a solid or as a foam-filled shell, by a number of suitable known techniques such as rotational moulding and blow moulding. When the case is constructed hollow or substantially so, it is preferably formed in at least two portions joined at the equator of the hemisphere. This is for ease of manufacture since otherwise it is difficult to remove a mould from within the case. A seam may remain as a result of this manufacturing process in which seam may be mounted the portion L for advertising and the like. The portion L may be readily provided with the ability to rotate. The mirror face is provided by another plastics moulding, preferably acrylic, with a reflective material, for example chromium, electroplated onto its front face. Alternative materials are polished stainless steel and a traditional silver-backed glass mirror.

FIG. 4 shows a view from the rear of a mirror similar to that shown in FIGS. 1 to 3. The recess R is shown as a right-angled recess since this will fit onto a front corner of most VDUs. The portion L for advertising and the like has been omitted from this figure.

The mirror is not restricted to a substantially hemispherical shape, however and FIG. 5 shows a view from the underside of a differently shaped mirror in accordance with the invention. The mirror face M and the portion of the case C adjacent to it are similar to those shown previously. However the rear portion of the mirror is elongated giving it a shape of half an ellipse in plan view. This provides a larger recess R for a given size of mirror face M which facilitates mounting of the mirror to a VDU. Numerous other shapes may be provided both for the mirror face M and the case C of the mirror.

FIG. 6 shows a portion of a VDU to which a mirror as shown in FIGS. 1 to 3 is attached. The VDU shown in FIG. 6 has a top front corner which is substantially right-angled in cross section which allows the recess of the mirror to fit quite snugly thereto. An adhesive layer G is provided on one or more of the faces of the recess of the mirror to affix it to the VDU in a non-destructive manner. The mirror is not a particularly heavy item and so can be attached satisfactorily using an adhesive of modest strength. This permits the mirror to be readily removed from the VDU without leaving any permanent legacy of its attachment.

An alternative construction of VDU is shown partially in FIG. 7 where the top front corner of the VDU is not particularly right-angled. It is assumed that the mirror face M should still be mounted substantially flat to the front surface of the VDU and so a pad P is provided in the recess of the mirror to fill the gap that results above the top surface of the VDU. The pad P may be provided with adhesive to assist in the fixing of the mirror to the VDU.

Figure 8:
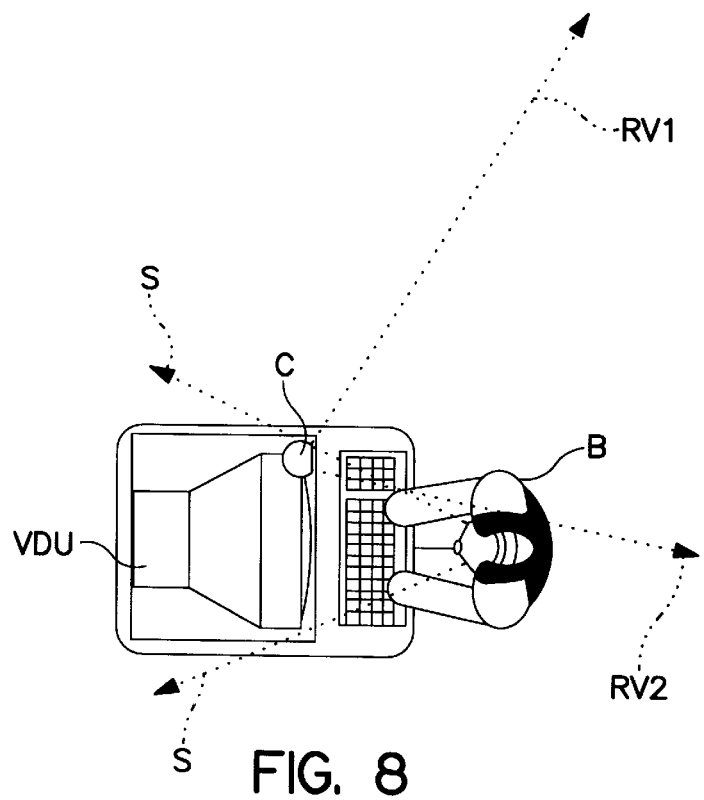
FIGS. 8 and 9 show an operator using a mirror or monitor in accordance with the invention.
Figure 9:
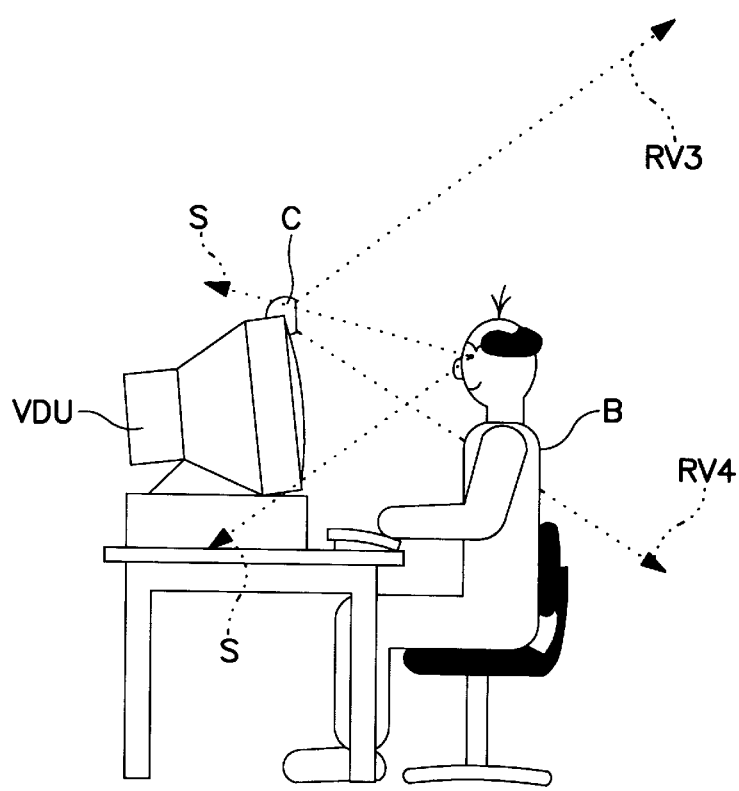

FIGS. 8 and 9 show a plan and a side view respectively of an operator B using a VDU and a mirror in accordance with the invention. It can be seen that the mirror (of which the case C is shown in the figures) is comfortably within the operator's lines of sight S and the rear view RV which it affords is shown in dotted lines. The line RV1, particularly, illustrates the advantage of using a convex mirror face. If the mirror were provided with a plane face, the field of rear view would be significantly reduced. It can be seen from FIG. 8 that the rear view afforded to the operator is substantially one-sided, predominantly over his right shoulder, as indicated between rear view line-of-reflective-sights RV1 and RV2. The horizontal field of rear view is between RV1 and RV2. Line-of-reflective-sights RV3 and RV4 show the vertical field of rear view. It will be readily appreciated that this can be rectified by adding a further mirror to the other top front corner of the VDU.

FIGS. 17 to 20 show a left side view, a front elevation, a right side view and a view from beneath a mirror according to another embodiment of the present invention. The mirror is similar in many respects to that shown in FIGS. 1 to 3. However, in this case, the front portion or bezel C1 of the case C is arranged to rotate relative to the rear portion C2 and the mirror M. The relative rotation of the mirror face is indicated by movement arrows (1); the mirror case by movement arrows (2). Furthermore, the mirror face M is also arranged to rotate relative to the case C. The mirror face M may be slightly asymmetrical in shape, or it may be mounted off-centre relative to the axis of rotation of the mirror face M such that as the face is rotated, the operator's width and angle of view can be altered.

Figure 10:
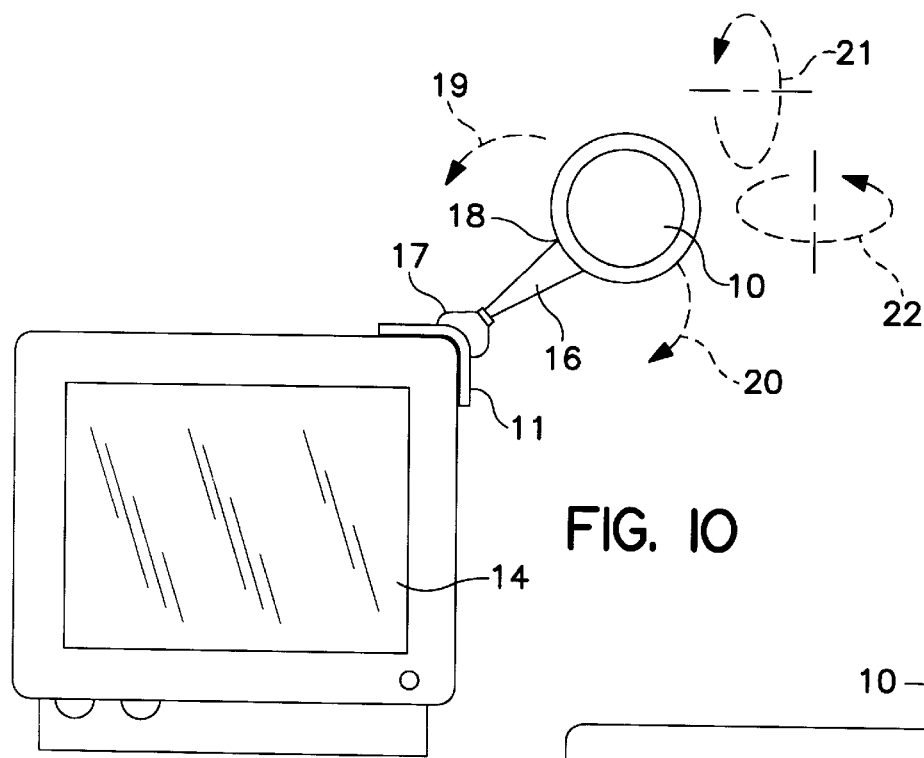
FIG. 10 shows an alternative mirror and monitor in accordance with the invention.
Figure 11:
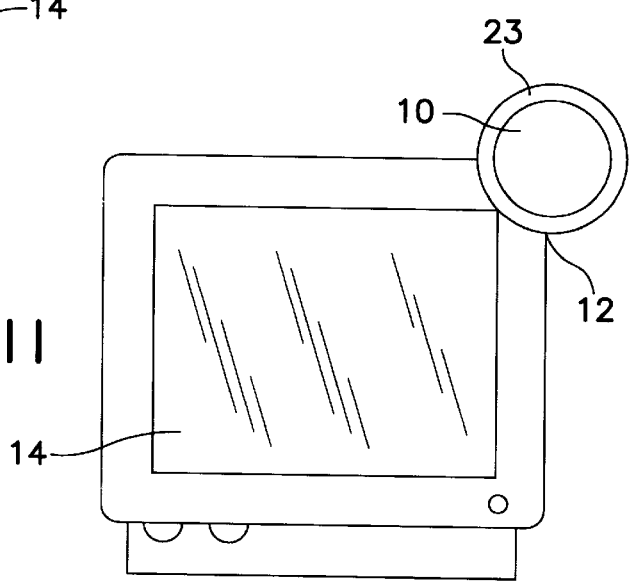
FIG. 11 shows a still further mirror and monitor in accordance with the invention.

The further embodiments of the invention shown in FIGS. 10 and 11 each comprise a mirror means 10 attached by mounting means 11 or 12 to a visual display unit (VDU) 14.

Figure 21:
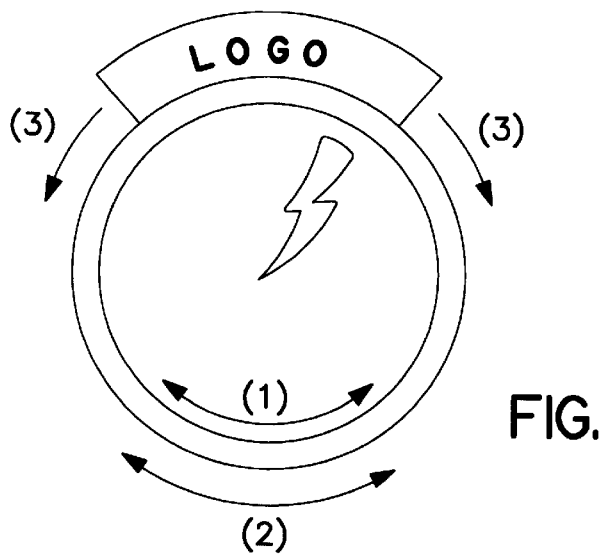
FIG. 21 is a front elevation of an alternative version of the embodiment of FIG. 17.

FIG. 21 shows a front elevation of the embodiment of FIGS. 17 to 20, but including the portion L for advertising and the like. The portion L is arranged to rotate relative to the case C as indicated by movement arrow (3). Thus, the bezel C1, the mirror face M and the portion L can each rotate independently of each other. This enables the operator to adjust the mirror of the present invention to precise requirements.

Figure 22:
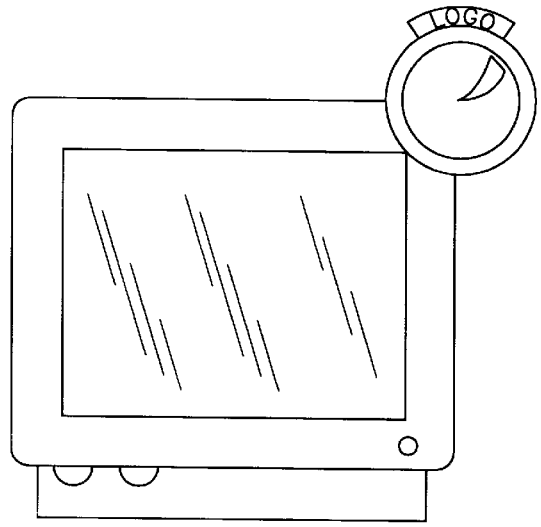
FIGS. 22 and 23 are front elevations of a computer screen showing the mirror of FIG. 21 in use.
Figure 23:
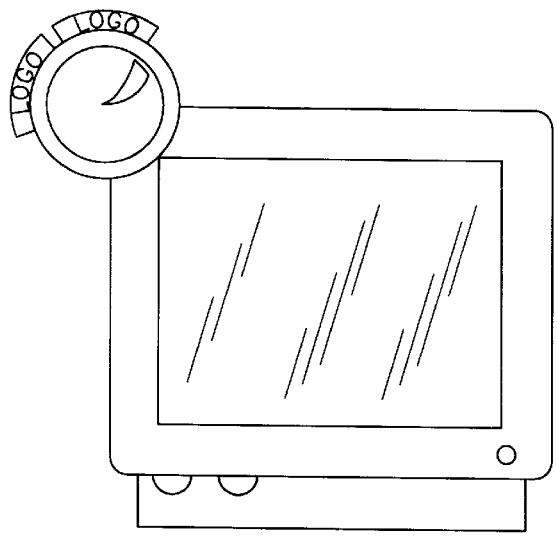
Figure 24:
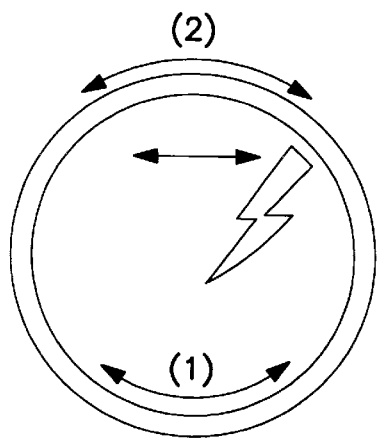
FIGS. 24 to 26 show the mirror of FIG. 17 in use.
Figure 25:
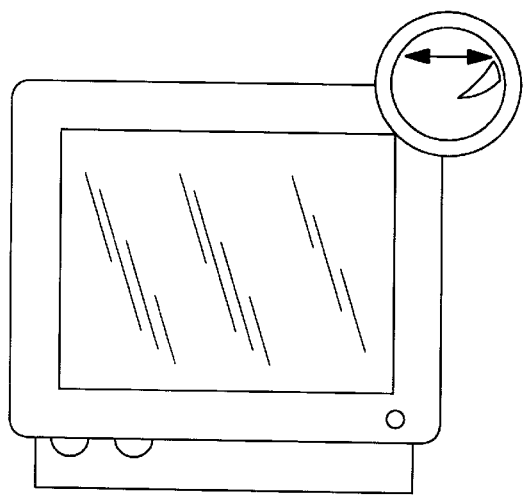
Figure 26:
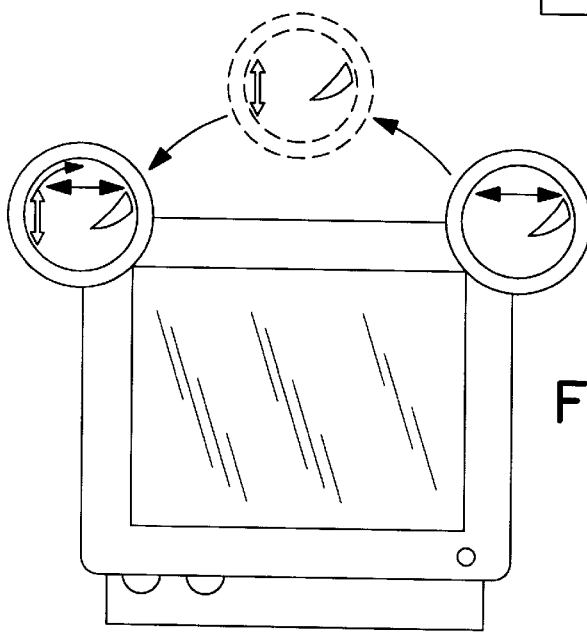

For example, with reference to FIGS. 22 and 23 of the drawings, the portion L when it is attached to the right hand corner of the computer screen or VDU G may be in the correct position relative to the case C, i.e. in the upper quadrant of the circular front face of the mirror [see FIG. 22]. However, when the mirror is attached to the left hand side of the VDU G, the portion L no longer occupies the correct quadrant of the front face, such that the logo or other printed matter on the portion L will be difficult to read, as shown in feint in FIG. 23. Thus, the portion L can be rotated relative to the case C so as to achieve the correct orientation and occupy the correct position. Similarly, if the mirror face M or the bezel C1 carry any printed matter, these may also need to be rotated such that the printed matter can be easily read by the operator, as shown in FIGS. 24 to 26.

It is also envisaged that the portion L in particular may be designed to have further accessories clipped thereto, for example, indicators which signify the type of software installed in the computer. Correct orientation of the portion L will therefore be required. The mirror may even be used for holding adhesive notes, such that correct adjustment of the individual components will be important.

In order to permit free relative rotation of the mirror face M, this is preferably self-locating within the case C and held in place by sprung elements (not shown), which may, for example, be formed integrally with the portion L for advertising and the like. The sprung elements may be arranged to urge the reflective surface of the mirror face M against the rim (not shown) formed by the bezel C1. This has the added advantage of improving mirror tolerance and improving the overall quality of the product.

In FIG. 10 the mounting means 11 is contoured to the shape of the visual display unit 14. The contour may be such that it can be attached to a variety of monitors of different shapes such as the VDUs shown in FIGS. 6 and 7. The means of attachment is permanent in accordance with the first aspect of the present invention in accordance with the second aspect of the invention, however, the attachment is non-permanent by means of adhesive, adhesive pads, adhesive tape, clamping means or other anchoring means such as pressure sensitive fasteners (for example marketed under the Trade Mark VELCRO) may be employed. The mirror means 10 in FIG. 10 is connected to the mounting means by a member 16. By using a member 16 of a given length, the extent of the rear view afforded to an operator may be extended. However this is at the cost of placing the mirror means further from the screen, which may make it necessary for the operator to move his or her eyes (or even head) to obtain a rear view. The member 16 may thus be dimensioned to achieve a favourable compromise in the distance of the mirror means 10 away from the monitor 14. The connection 17 between member 16 and the mounting means 11 and also the connection 18 (hidden from view in the figure) between the member 16 and the mirror 10 may be articulated by means of a ball and socket, hinges or integrally in the form of a flexible member 16. Other means of articulation may be employed as desired. The combination of the shape of the member 16 and the articulated connections 17 & 18 enable the mirror 10 to be adjusted in several planes and directions as shown by the broken lines 19, 20, 21 and 22 to the operator's favoured position and angle or real view. The face of the mirror means 10 may be shaped as previously discussed to provide a suitably wide rear view perspective. This shaping of the mirror may involve shaping only the border of the mirror or also the contours of the mirror to provide convex, planar or concave profiles or any combination thereof.

In FIG. 11 an embodiment is shown in which the mounting means 12 also comprises a mirror holder 23. In this case the holder 23 is specifically adapted to fit the visual display unit. The mounting means 12 in this embodiment may also be contoured such that it can be attached to a variety of VDUs of different shapes. The mirror means 10 may be fixed or articulated with the holder 23, this may be achieved by means of a ball and socket connection although other means of articulation may be employed. This embodiment provides a permanent attachment to the monitor in accordance with the first aspect of the present invention and a removable attachment in accordance with the second aspect. The embodiment shown in FIG. 11 will result in a restricted angle of rear view compared with that shown in FIG. 10 when the two are used with a mirror of the same size and profile.

Figure 12:
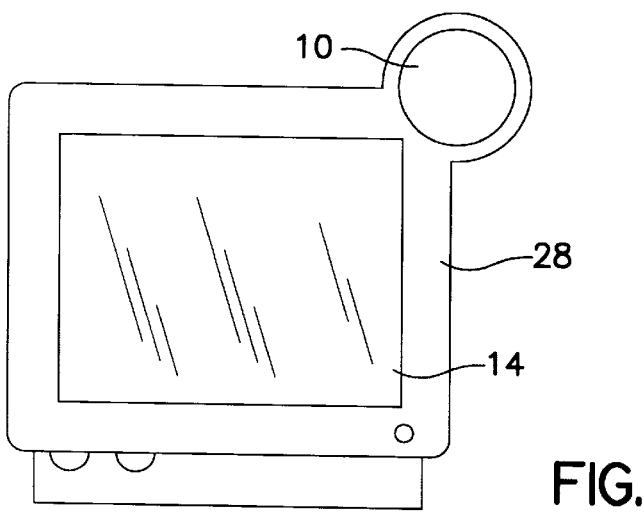
FIG. 12 shows a monitor in accordance with the second aspect of the invention.

FIG. 12 shows an embodiment of the invention in which the mirror 10 is provided in a holder that is moulded integrally with the case 28 of a VDU. The mirror 10 is preferably articulated within the mounting to provide an operator with an adjustable field of rear view. This can be achieved using a ball and socket joint, hinge means or other suitable articulation techniques as discussed previously.

Another monitor in accordance with the invention is provided with a substantially rectangular mirror (not shown) with a non-uniform convex profile. This is mounted above the screen of the VDU either on the front face thereof or towards the front of the upper surface. The mirror is substantially planar towards the centre but exhibits a progressively more convex profile towards the shorter edges thereof. The mirror is similar to a so-called "ten lane mirror" which may be fitted alongside an interior rear view mirror in a vehicle. As its name suggests, its purpose is to give the vehicle driver a particularly wide rear view. A monitor in accordance with the present invention provided with such a mirror would similarly give a comprehensive rear view to an operator. Admittedly it is also likely to show operators a view of themselves but this has not always been found to meet with resistance. Where an operator does not want to see him- or herself, the mirror may be blanked off in the portion that would give this section of rear view. The portion of the mirror may preferably be blanked off with a section of advertising material or a corporate name for example.

Figure 13:
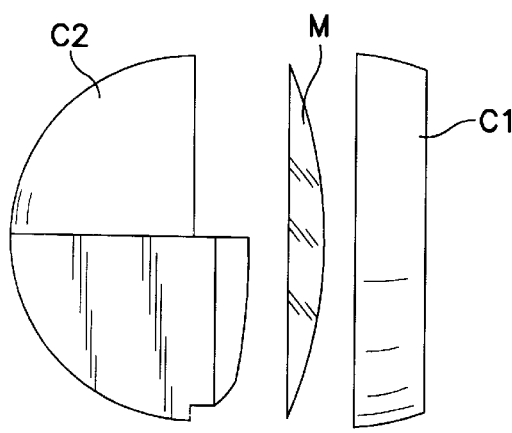
FIG. 13 shows an exploded side view of a mirror in accordance with the second aspect of the invention, which mirror may be adjusted for angle of view.

FIG. 13 shows an exploded side view of a mirror similar to that shown in FIGS. 1 to 4. A rear portion of the case C2 and a front portion C1 thereof are shown together with a mirror face M. The mirror is assembled by sandwiching the mirror face M between the two portions of the case C which may conveniently be provided with one each of a tongue and a groove to provide a snap fit. In this embodiment the portion C2 of the case is not totally hemispherical. Since the mirror face is substantially aligned with the portion C1 of the case this allows the operator to adjust the field of rear view. The method employed is as follows. Because of the shape of C2, as the portion C1 is twisted relative to portion C2, the mirror face M changes its angle with respect to portion C2. Since the portion C2 is attached to the VDU, this alters the operator's field of rear view.

Figure 14:
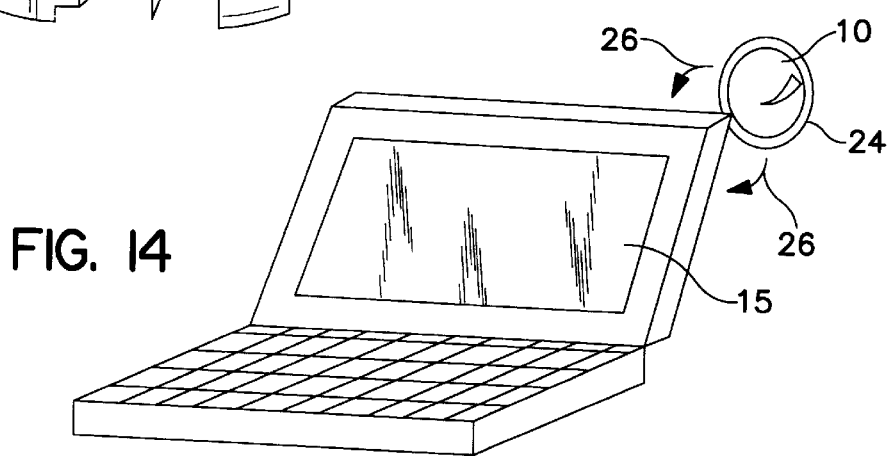
Figure 15:
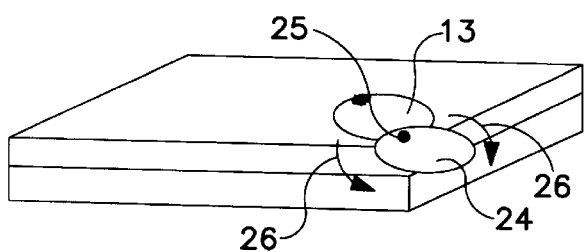
Figure 16:
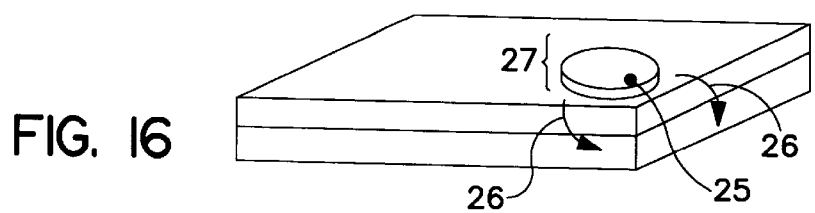
Figure 17:
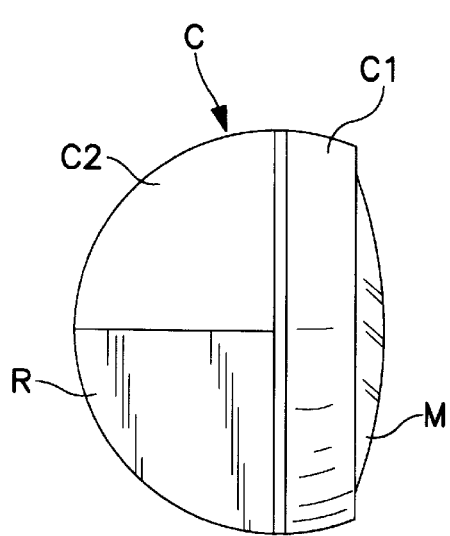
FIG. 17 is a left hand side view of another embodiment of a mirror according to the present invention.
Figure 18:
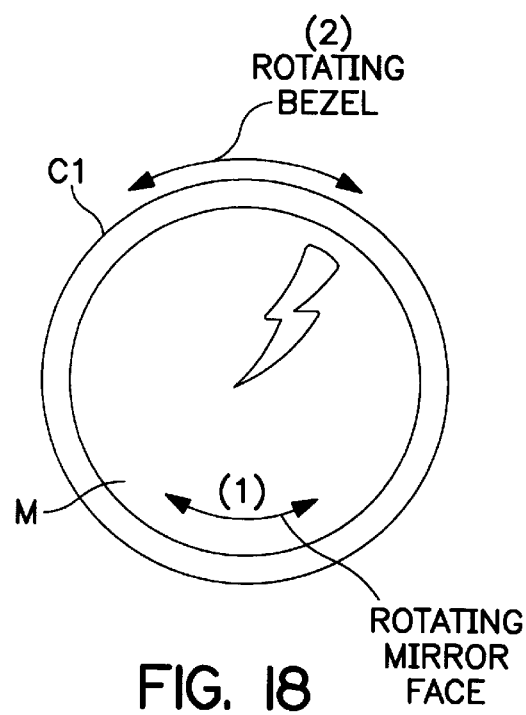
FIG. 18 is a front elevation of the mirror of FIG. 17.
Figure 19:
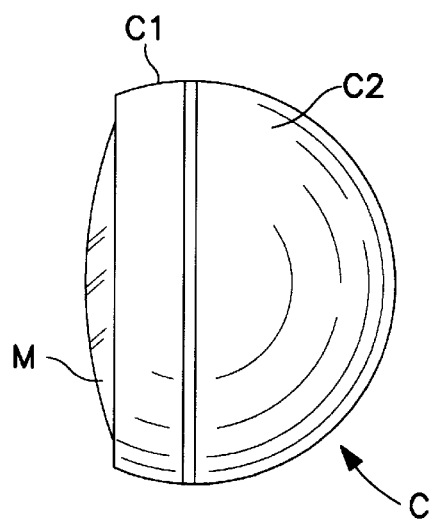
FIG. 19 is a right hand side view of the mirror of FIG. 17.
Figure 20:
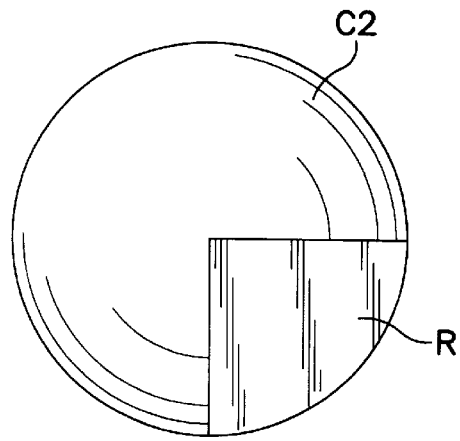
FIG. 20 is a view from beneath the mirror of FIG. 17.

The embodiment of the invention shown in FIGS. 14 to 16 is particularly for use on portable equipment incorporating a monitor or visual display unit 15. In this case the mounting means 13 and mirror housing 24 are articulated to a point 25 such that the mirror 10 may be folded away. The arrows 26 illustrate the mirror case 24 being stowed in FIG. 14 and arranged for operation in FIGS. 15 and 16. FIG. 16 shows the mirror means folded into a compact and robust unit 27 suitable for carriage and the possible rigours entailed.

The invention is not limited to the specific embodiments described above. Variations and alterations will be apparent to a reader skilled in the art.

What is claimed:

1. A monitor comprising:

a screen housing having a viewing screen situated therein;

a mirror housing attached to the screen housing in substantially fixed orientation with respect to the screen housing; and a mirror having a viewing surface rotatably carried by the mirror housing such that the mirror is rotatable with respect to the mirror housing about an axis of rotation that is substantially perpendicular to the viewing surface, the mirror arranged with respect to the screen to give a user viewing the screen a line of sight to the rear of the user.

2. The monitor as recited in claim 1, wherein the screen housing has a first side and a second side and the mirror housing is simultaneously attached to both the first side and the second side of the screen housing.

3. The monitor as recited in claim 2, wherein the first side and the second side of the screen housing meet to define a corner and the mirror housing has a recess adapted to receive and fit the corner.

4. The monitor as recited in claim 1, wherein the mirror housing includes a bezel and a spring element for urging the mirror against the bezel.

5. The monitor as recited in claim 1, wherein the mirror housing includes an extended portion for use in carrying printed matter.

6. The monitor as recited in claim 5, wherein the extended portion is rotatable relative to the mirror housing.

7. A mirror for use in conjunction with a monitor housing having first and second sides that meet to define a corner, the mirror comprising:

a mirror housing adapted to be simultaneously attached to both the first and second sides of the monitor housing; and a generally non-planar reflective surface rotatably mounted within the mirror housing about an axis that is generally parallel to the corner defined by the first and second sides, the mirror providing a user viewing the monitor with a line of sight to the rear of the user.

8. The mirror as recited in claim 7, wherein the housing includes a recess into which the corner defined by the first side and the second side is adapted to fit.

9. A viewing device for use in conjunction with a lap-top computer comprising a screen housing having a first side and a second side that meet to generally define a line and which carries a video screen, the mirror comprising:

a viewing device housing carrying a reflective surface providing a user viewing the video screen with a line of sight to the rear of the user, the viewing device housing adapted to be attached to the screen housing such that the viewing device housing is rotatable about an axis that is generally parallel to the line defined by the meeting of the first and second sides, the viewing device housing being moveable between a first position wherein the viewing device housing and reflective surface are in overlapping protected relation with respect to the screen housing and a second position wherein the viewing device housing is in substantial non-overlapping, extended relation with respect to the screen housing.

10. A viewing device for use in conjunction with a monitor carried within a monitor housing, the mirror comprising:

a viewing device housing adapted to be attached to the monitor housing in substantially fixed orientation with respect to the monitor housing; and a mirror having a viewing surface rotatably carried by the viewing device housing such that the mirror is rotatable with respect to the viewing device housing about an axis that is substantially perpendicular to the viewing surface, the viewing device adapted to provide a user viewing the monitor with a line of sight to the rear of the user during use of the monitor by the user.

\* \* \* \* \*